United States Patent [19]

Hamaguchi

[11] Patent Number: 5,794,873

[45] Date of Patent: Aug. 18, 1998

[54] MAGNETIC RECORDING-REPRODUCTION APPARATUS HAVING MOVABLE REEL SUPPORTS

[75] Inventor: Toshihide Hamaguchi, Moriguchi, Japan

[73] Assignee: Sanyo Electric Co., Ltd., Osaka, Japan

[21] Appl. No.: 701,169

[22] Filed: Aug. 21, 1996

[30] Foreign Application Priority Data

| Aug. 22, 1995 | [JP] | Japan | 7-213634 |
| Sep. 20, 1995 | [JP] | Japan | 7-241710 |
| Oct. 6, 1995 | [JP] | Japan | 7-259959 |

[51] Int. Cl.$^6$ ............... G11B 23/04; G11B 5/008
[52] U.S. Cl. ........................ 242/336; 360/94
[58] Field of Search ............... 242/336; 360/94

[56] References Cited

FOREIGN PATENT DOCUMENTS

| 0 634 749 A2 | 1/1995 | European Pat. Off. |
| 0 634 749 A3 | 1/1995 | European Pat. Off. |
| 7-29250 | 1/1995 | Japan. |
| 2 164 193 | 3/1986 | United Kingdom. |

Primary Examiner—John Q. Nguyen
Attorney, Agent, or Firm—Armstrong, Westerman, Hattori, McLeland & Naughton

[57] ABSTRACT

Two kinds of large and small cassettes having respective unlocking apertures for fitting a common unlocking member therein can be loaded onto a chassis. When the cassettes are loaded in position with their tape centers in coincidence, the unlocking apertures are displaced from each other by Δ Y. Mounted on the chassis are a pair of pivotal levers each supporting a reel support on a free end thereof, a drive slide reciprocatingly movable on the chassis for controlling the rotation of the pivotal levers and moving the reel supports to two different positions corresponding respectively to the large and small cassettes, a drive gear for driving the slide, and pressure contacting mechanism disposed between the gear and the slide for positioning and holding the slide in two cassette loading positions by pressing contact, with the rotation of the gear. The drive slide has the unlocking member projecting from its upper surface and is slidingly movable only by the distance Δ Y in corresponding relation with the cassette loading positions.

3 Claims, 12 Drawing Sheets

MAGNETIC RECORDING-REPRODUCTION APPARATUS HAVING MOVABLE REEL SUPPORTS

FIELD OF THE INVENTION

The present invention relates to magnetic recording-reproduction apparatus for recording and reproducing signals with use of a magnetic tape, and more particularly to a magnetic recording-reproduction apparatus having movable reel supports and adapted to load thereon large and small two kinds of cassettes which are different in the spacing between the reels.

BACKGROUND OF THE INVENTION

A magnetic recording-reproduction apparatus has already been proposed which is shown in FIGS. 11 and 12 and wherein the spacing between reel supports is variable for use with large and small two kinds of cassettes with different reel-to-reel spacings (see JP-A-29250/1995). A rotary cylinder 200 is provided on a chassis 7 for winding therearound the tape withdrawn from a cassette. In the following description, the side at which the rotary cylinder 200 is provided will be referred to as the front. There are two positions to which each of two reel supports 5 is to be moved for a large cassette 1 and small cassette 2, respectively. FIG. 11 shows the loading position for the large cassette 1, and FIG. 12 that for the small cassette 2.

Mounted on the chassis 7 are pivotal levers 50, 50 each carrying the reel support 5 on its inner end, a straightforward slide 100 which is slidable forward and rearward, and a pivotal arm 110 in engagement with the slide 100. The arm 110 has a left end pivoted to a limiter mechanism 300 and is pivotally driven by a drive gear 8 mounted on a right end portion of the chassis 7. The limiter mechanism 300 has a spring for holding the end of the pivotal arm 110, and has a construction known for use in VTRs of the type described and other small-sized precision devices. The slide 100, which is placed on the pivotal arm 110, is formed with a slot 120 extending in the front-to-rear direction, and a fixed pin 310 projecting from the chassis 7 is fitted in the slot 120, allowing the slide 100 to move forward and rearward only. The slide 100 is further centrally formed with a lateral slot 130, and a pin 140 projecting from the pivotal arm 110 is engaged in the slot 130, whereby the slide 100 is made slidable with the pivotal arm 110 forward and rearward.

The chassis 7 has a pair of pivots 320, 320 projecting upward therefrom and spaced apart laterally of the apparatus. The pivotal levers 50, 50 are rotatably fitted around the pivots 320, 320, respectively. Each of the pivotal levers 50 has the range of its pivotal movement limited by a stopper pin 75 on the chassis 7. A slot 150 is formed in a free end of the lever 50 and has fitted therein a pin 160 projecting from each of opposite ends of the straightforward slide 100. The slide 100 and the pivotal arm 110 are formed with cutouts (not shown) for avoiding interference with the pivots 320, 320 when shifting.

The drive gear 8 rotates counterclockwise when the reel supports 5, 5 move from the position where the large cassette 1 can be loaded on the supports to the position where the small cassette 2 can be loaded thereon. As shown in FIG. 12, the pivotal arm 110 moves downward about the pivot on the limiter mechanism 300 to retract the slide 100. The pivotal levers 50 in engagement with the slide 100 each rotate inward about the pivot 320, bringing the reel supports 5 to the position for the small cassette 2.

The large and small cassettes are usually provided with a reel lock mechanism. FIG. 13 is a plan view of the reel lock mechanism of the cassette, and FIG. 14 is a view in section taken along the line X—X in FIG. 13 and showing the same with the cassette bottom down. The reels 600 of the cassette each have a toothed face 610 along the periphery. A lock piece 620 having pawls 630 meshing with the respective toothed faces 610 is provided between the reels 600, 600 at the rear end of the cassette and is slidable forward and rearward. A slider 660 connected to the lock piece 620 is guided by a pair of rails 650, 650 and biased forward by a spring 670. The slider 660 is open at its bottom and opposed to an unlocking aperture 14 or 24 in the bottom wall of the cassette. An unlocking member 41 is fittable into the slider 660 through the aperture 14. As shown in FIG. 14, the unlocking member 41 has a slope portion 41a opposed to the rear wall 640 of the cassette. Upon the slope portion 41a coming into contact with the inner wall of the slider 660 when the cassette is loaded, the slider 660 slidingly moves rearward against the force of the spring 670. The lock piece 620 connected to the slider 660 also moves rearward, disengaging the pawls 630 from the toothed faces 610 of the reels 600 and rendering the reels 600 rotatable.

With the recording-reproduction apparatus adapted for use with both the large and small cassettes 1, 2, it is necessary to move the unlocking member 41 for each of the cassettes. The apparatus shown in FIG. 11 has another mechanism (not shown) for moving the unlocking member 41, in addition to the slide 100 and the pivotal arm 110.

However, the recording-reproduction apparatus described has the following problems.

1. With the prior-art apparatus, the mechanism for moving the reel supports 5, 5 comprises many components which are large-sized and is complex in construction. The limiter mechanism is required specifically for positioning the reel supports in place and is an impediment to compacting the apparatus.

2. The apparatus of the type described also requires a prop mechanism for supporting the large and small cassettes on the chassis 7. The tape centers of the cassettes 1, 2 then need to coincide for recording and reproduction, but the cassettes 1, 2 are different in thickness and therefore propped at different levels. Accordingly, the mechanism for supporting the large and small cassettes must be adapted for a changeover in conformity with the cassette size and yet needs to have a simple construction.

SUMMARY OF THE INVENTION

An object of the present invention is to provide a reel support moving mechanism occupying a reduced space, comprising a reduced number of components and adapted to reliably hold a slide member in position with pressure.

Another object of the invention is to provide a mechanism of simple construction for supporting large and small cassettes in conformity with the cassette size.

The reel support moving mechanism has pressure contacting means provided between a drive gear 8 and the slide member and comprising an intermediate lever 80 for driving the slide member, a movable lever 82 and a spring member. Accordingly, the pressure contacting means for positioning reel supports 5, 5 in place has a simpler construction than in the prior art.

The slide member, i.e., drive slide 4, has a holding piece 3 having a prop pin 30 for supporting the bottom of the small cassette 2 and pivotally movable within a vertical plane parallel to the direction of sliding movement of the drive slide 4. A chassis 7 is provided with a slope 73 for causing the holding piece 3 to slide down to position the top end of the prop pin 30 at a lower level than the bottom surface of the large cassette 1 upon the drive slide 4 moving to a position corresponding to a loading position for the large cassette 1. This eliminates the likelihood of the prop pin 30 for the small cassette 2 becoming an impediment to loading the large cassette 1.

The chassis 7 is further provided thereon with a slide unit 6 movable with the drive slide 4 between the loading positions for the respective large and small cassettes 1, 2. The slide unit 6 has a holding lever 65 pivoted thereto and provided with a prop pin 66 for supporting the small cassette 2. The prop pin 66 moves out from the large cassette loading position when the slide unit moves to this loading position. This precludes the prop pin 66 from becoming an impediment to the loading of the large cassette 1.

Since the prop pins 30, 66 are provided respectively on the holding piece 3 and the slide unit 6 which are connected to the drive slide 4, the mechanism for moving the prop pins 30, 66 is simple in construction.

DESCRIPTION OF THE PREFERRED EMBODIMENT

Figure 1:
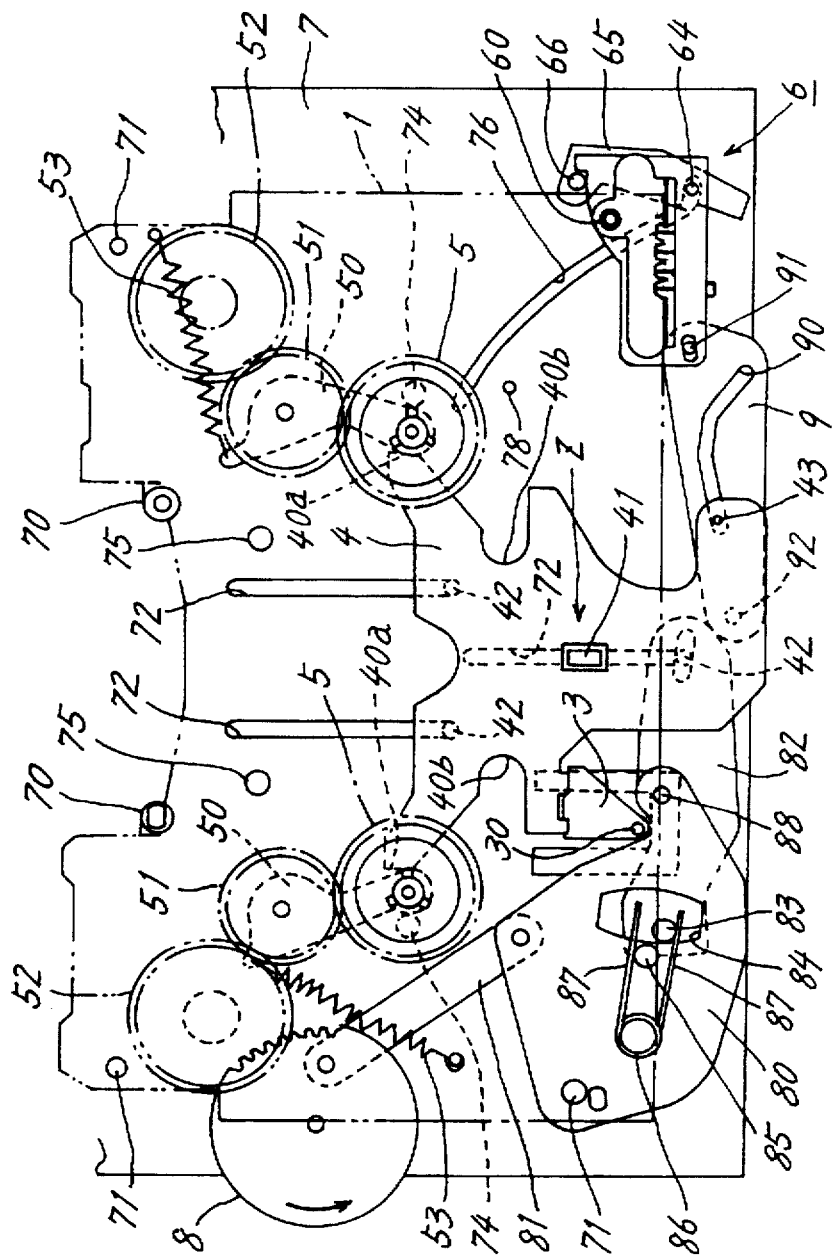
FIG. 1 is a plan view showing an arrangement of components when a large cassette is loaded.

A magnetic recording-reproduction apparatus embodying the invention will be described below. Throughout the drawings, like parts are designated by like reference numerals.

Figure 13:
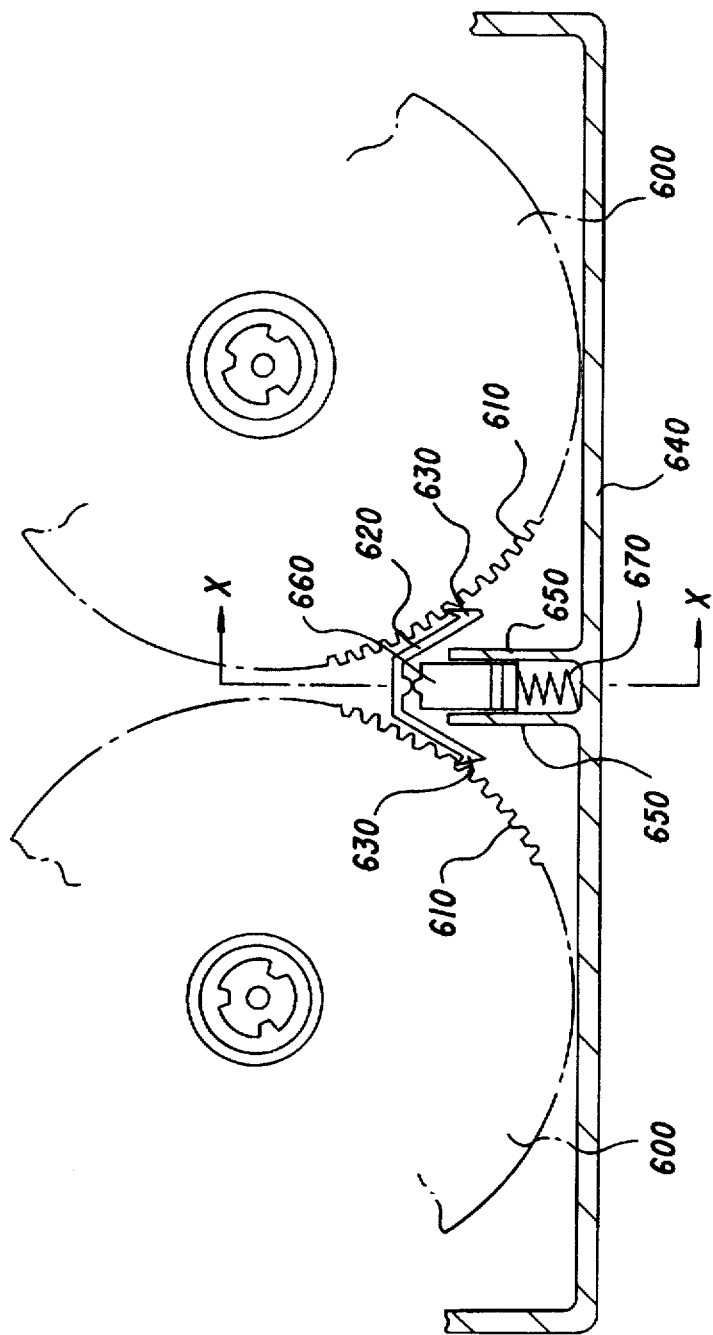
FIG. 13 is a plan view of a reel lock mechanism of a cassette.
Figure 14:
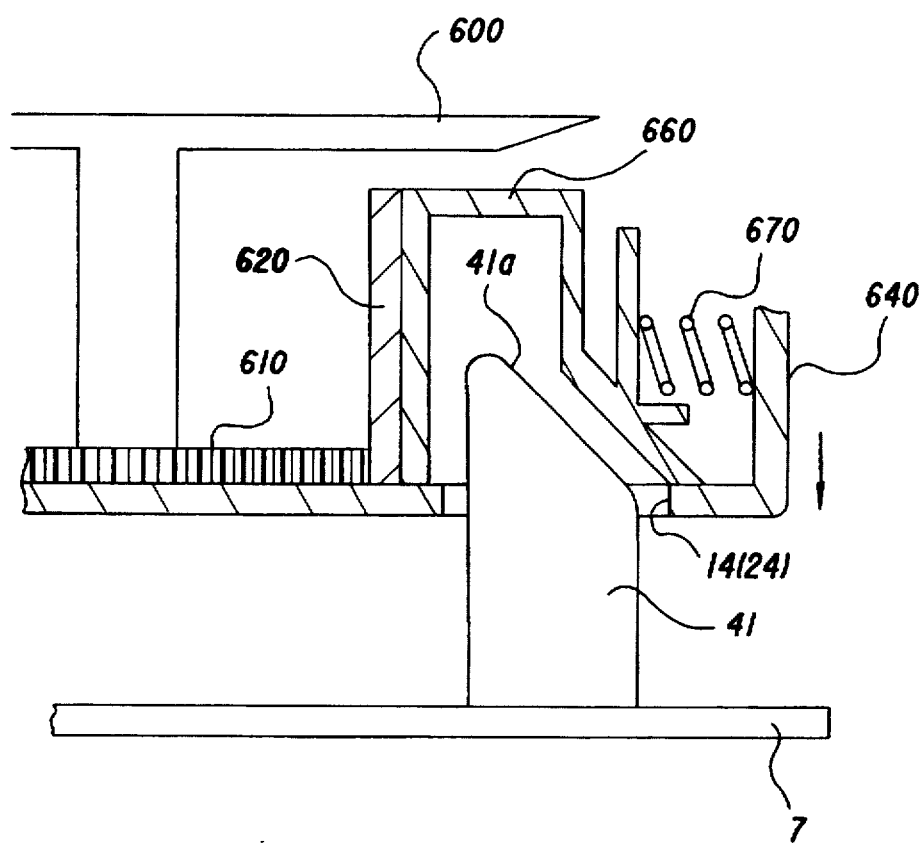
FIG. 14 is a view in section taken along the line X—X in FIG. 13 and showing the same with the bottom of the cassette down.

The present embodiment is a magnetic recording-reproduction apparatus adapted to be loaded with two kinds of large and small cassettes which are different in the spacing between the reels, and the present invention relates mainly to digital VTRs. The two kinds of cassettes will be described first generally. The cassettes have a mechanism for locking the reels which has the same construction as the conventional one shown in FIG. 13.

Figure 9A:
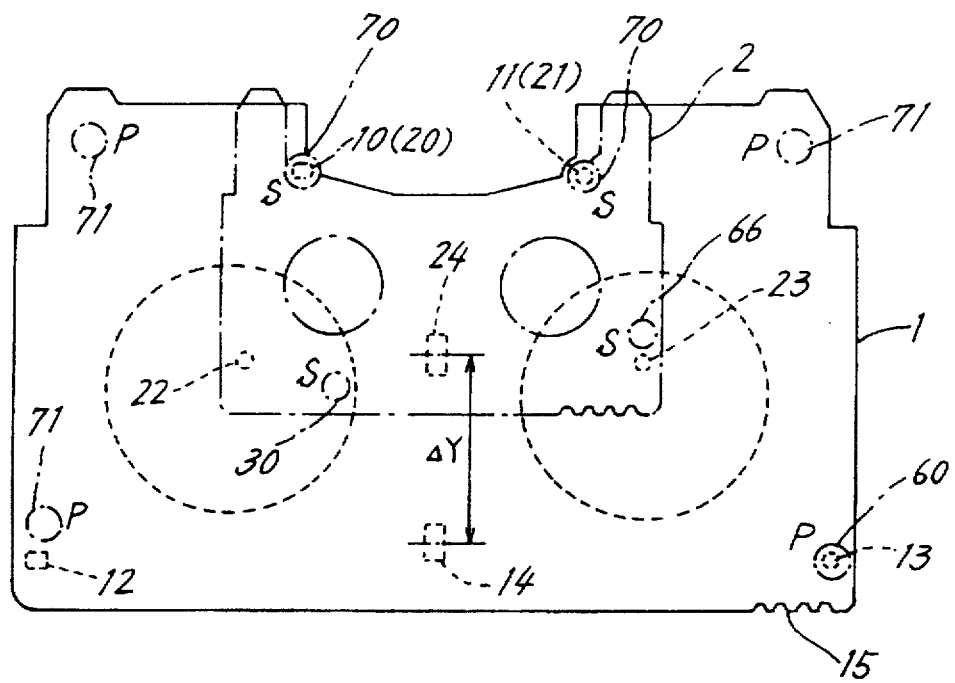
FIG. 9A is a plan view showing the small cassette loading position and a large cassette loading position on a chassis in superposed relation.
Figure 9B:
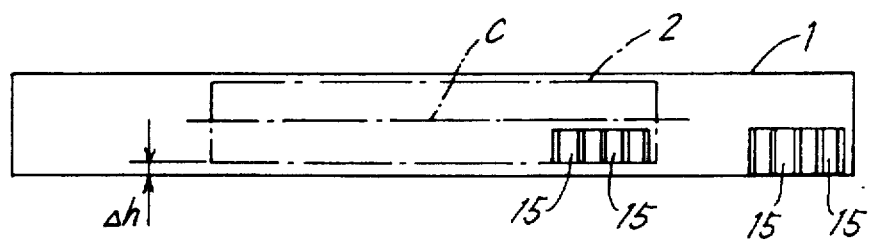
FIG. 9B is a rear view of the large and small cassettes loaded on the chassis with their tape centers in coincidence to show the relationship between the cassettes in level.

FIG. 9A is a plan view of the large cassette 1, and FIG. 9B is a rear view of the same. The small cassette 2 is indicated in dot-and-dash lines in FIGS. 9A and 9B. The bottom wall of the large cassette 1 is formed with two front positioning holes 10, 11 at its front end portion and two rear positioning holes 12, 13 at its rear end portion. The rear positioning hole 12 of the cassette at the left is not used for positioning in the present apparatus. At the midportion between the two rear positioning holes 12, 13, the cassette 1 has an unlocking aperture 14 for fitting therein a member 41 for unlocking the reels.

Like the large cassette 1, the small cassette 2 is also formed in its bottom wall with four positioning holes 20, 21, 22, 23. The distance between the front positioning holes 20, 21 at the front is equal to the distance between the front positioning holes 10, 11 of the large cassette 1. The same stepped pin 70 on a chassis 7 fits into the front positioning hole 10 (11) of the large cassette 1 and the front positioning hole 20 (21) of the small cassette 2 (see FIG. 10). The cassette 2 has an unlocking aperture 24 at the midportion between the two rear positioning holes 22, 23. The left hole 22 is not used for positioning.

When the front positioning holes 10, 11 of the large cassette 1 are registered with those 20, 21 of the small cassette 2, the unlocking apertures 14, 24 are away from each other by a distance ΔY longitudinally of the apparatus. With the apparatus of the present embodiment, the unlocking member 41 fittable in the unlocking apertures 14, 24 is reciprocatingly movable by the longitudinal distance ΔY in accordance with the cassette size.

Further when the large and small cassettes 1, 2 are loaded in place with their tape centers C in coincidence as shown in FIG. 9B, the bottom surface of the small cassette 2 is Δh higher in level than that of the large cassette 1. Accordingly, common pins are not used for supporting the two cassettes 1, 2. Each of the cassettes 1, 2 is provided at the right rear end portion thereof with four detection terminals 15, 15, 15, 15, through which is retrieved information as to the kind of the cassette and the contents of record and stored in a memory (not shown) inside the cassette.

Figures 10A, 10B:
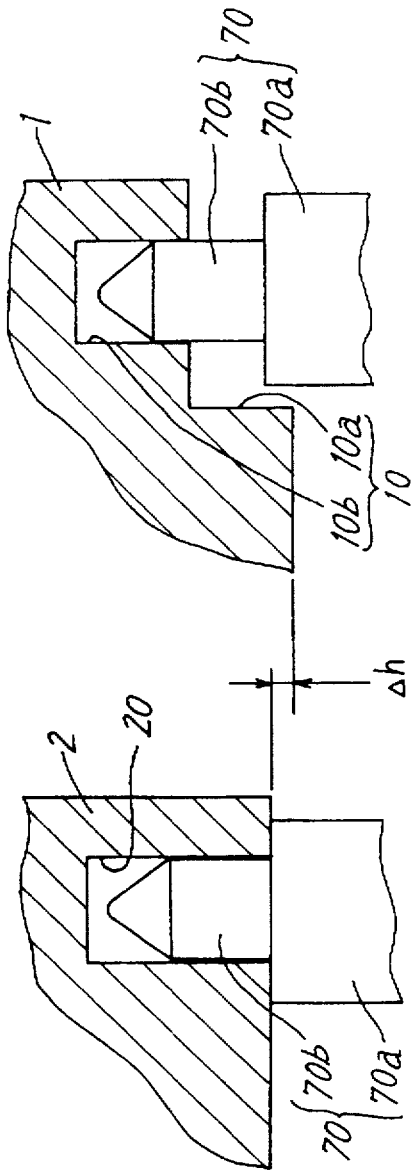
FIG. 10A is a sectional view showing the small cassette as fitted over a stepped pin.
FIG. 10B is a sectional view showing the large cassette as fitted over the stepped pin.
Figure 11:
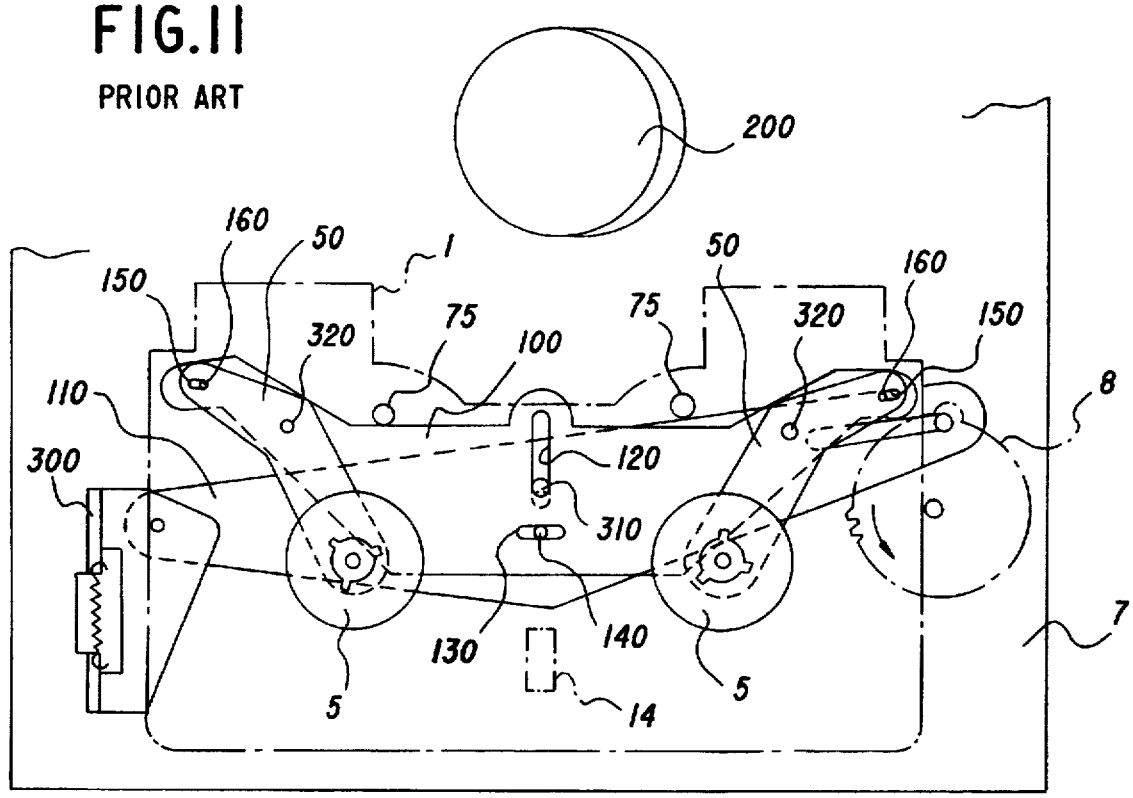
FIG. 11 is a plan view of a large cassette loading position in a conventional magnetic recording-reproduction apparatus.
Figure 12:
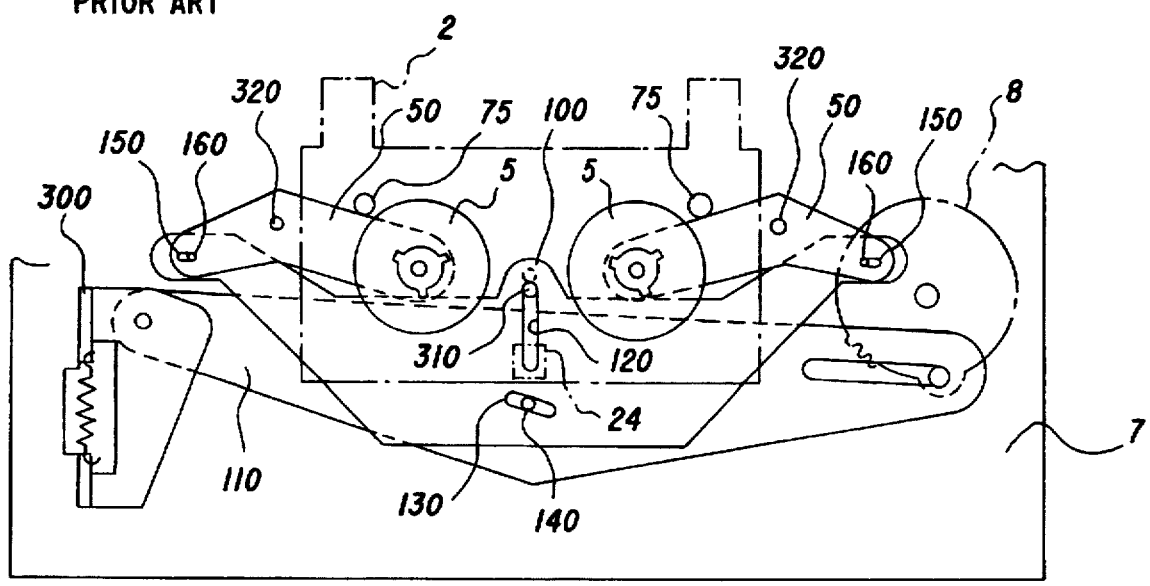
FIG. 12 is a plan view of a small cassette loading position in the same.

The small cassette 2 is fitted around stepped pins 70 at the respective front positioning holes 20, 21. As seen in FIG. 10A, each stepped pin 70 comprises a prop boss 70a for the bottom wall of the small cassette 2 to bear on, and a fitting shank 70b projecting from the top end of the boss 70a integrally therewith and fittable in the front positioning hole 20 or 21 of the cassette 1.

As shown in FIG. 9B, the large cassette 1 is also fitted around the respective stepped pins 70 at the front positioning holes 10, 11. Unlike the holes 20, 21 of the small cassette 2, the holes 10, 11 each have a large-diameter portion 10a and a small-diameter portion 10b at two different levels. Since the bottom surface of the large cassette 1 is lower than that of the small cassette 2 when the tape centers are in coincidence, the fitting shank 70b fits into the small-diameter portion 10b, while the prop boss 70a is positioned in the large-diameter portion 10a, and the top surface of the prop boss 70a is out of contact with the bottom surface of the large cassette 1.

With reference to FIG. 9A, the regions P represent pins arranged for supporting the bottom of the large cassette 1, and the regions S represent pins arranged for supporting the bottom of the small cassette 2. The right rear end portion of the large cassette 1 is supported by the slide unit 6 to be described later, and other three portions by prop pins 71, 71, 71 fixed to the chassis 7. The three prop pins 71 fixedly mounted on the chassis 7 are positioned outside the loading position for the small cassette 2, and are not used for supporting the cassette 2.

The front end portion of the small cassette 2 is supported at its opposite sides by the stepped pins 70, 70 fixed to the chassis 7, and opposite sides of the rear end portion thereof respectively by prop pins 30, 66 slidable on the chassis 7. A stepped pin 60 for supporting the large cassette 1 moves to the rear positioning hole 23 at the right side of the cassette 2, and the top end of the pin 60 fits into the hole.

In other words, the large cassette 1 is supported by the three prop pins 71, 71, 71 on the chassis 7 and by the slide unit 6 slidable on the chassis 7, and is positioned in place within a horizontal plane by the slide unit 6 and by the two stepped pins 70, 70 fittable into the cassette front end portion.

The small cassette 2 is supported by the prop bosses 70a of the two stepped pins 70, 70 fittable into the cassette front end portion and by the prop pins 30, 66 slidable on the chassis 7, and is positioned in place within a horizontal plane by the fitting shanks 70b of the stepped pins 70, 70 and by the slide unit 6 slidable on the chassis.

BRIEF DESCRIPTION OF THE APPARATUS

Figure 4:
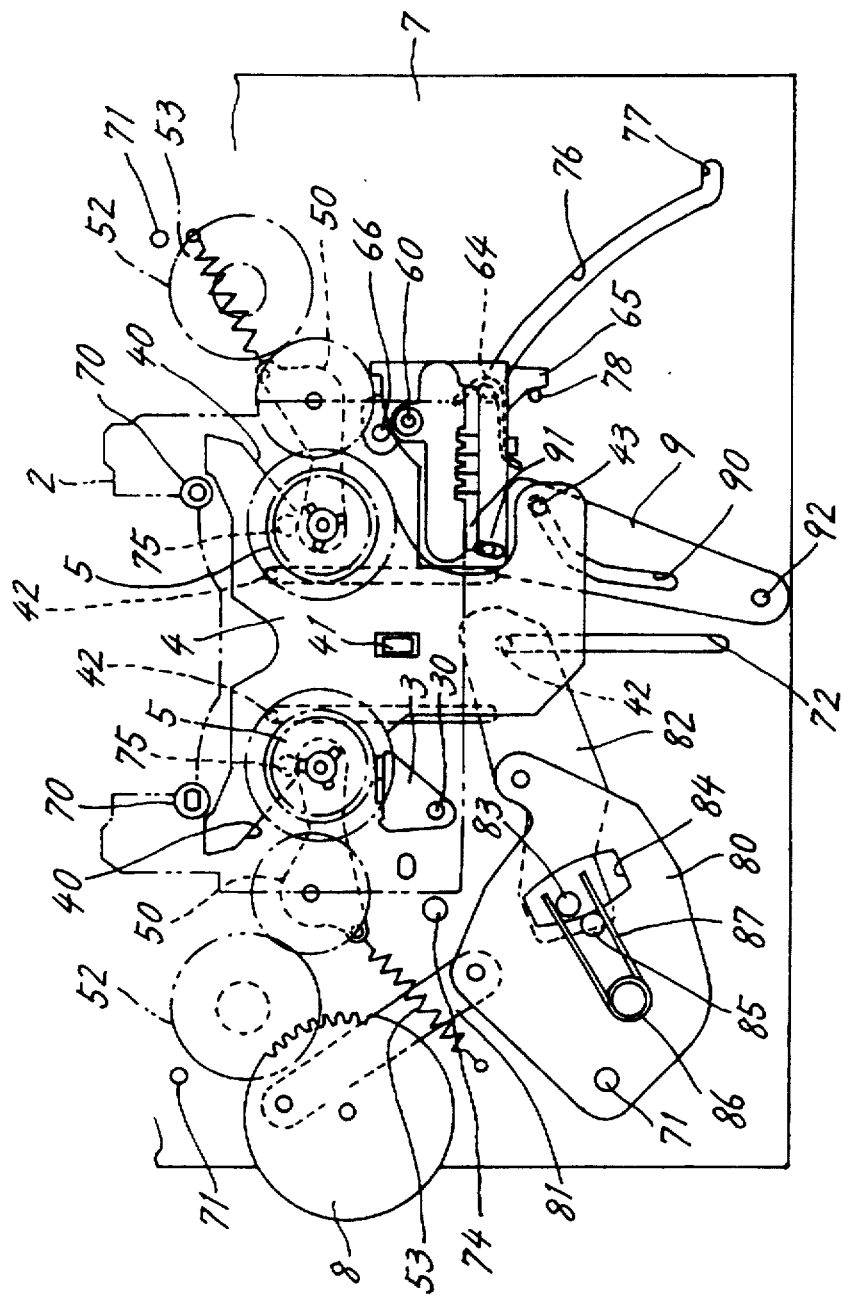
FIG. 4 is a plan view showing the components as arranged when the small cassette is loaded.

With the present apparatus, the same reel supports 5, 5 are moved in accordance with the cassette size. FIG. 1 is a plan view showing the position of the reel supports 5, 5 for the large cassette 1, and FIG. 4 is a plan view showing the position of the reel supports 5, 5 for the small cassette 2.

With reference to FIG. 1, each reel support 5 is rotatably supported on a free end of a pivotal lever 50 pivoted to the chassis 7, and is coupled to a motor gear 52 positioned upstream thereof, by way of an intermediate gear 51 which is mounted on the pivot of the lever 50. The pivotal lever 50 is biased inward by a tension spring 53 provided between the lever and the chassis 7, and has the range of its movement limited by stopper pins 74, 75 projecting from the chassis 7.

A drive slide 4 slidable on the chassis 7 forward and rearward is disposed between the two reel supports 5, 5 and allowed to slide only forward and rearward by engaging pins 42, 42, 42 projecting from the lower surface of the slide and fitting in respective slots 72, 72, 72, which are formed in the chassis 7 and extend longitudinally of the chassis (in the front-to-rear direction). The front end of the drive slide 4 is formed at its opposite sides with cam faces 40, 40. The free end of each lever 50 is movable into contact with the cam face 40. The unlocking member 41 fittable in the unlocking apertures 14, 24 projects upward from the central portion of the slide 4. The cam face 40 includes an inclined cam face 40a and a circular-arc cam face 40b continuous therewith.

Figure 3:
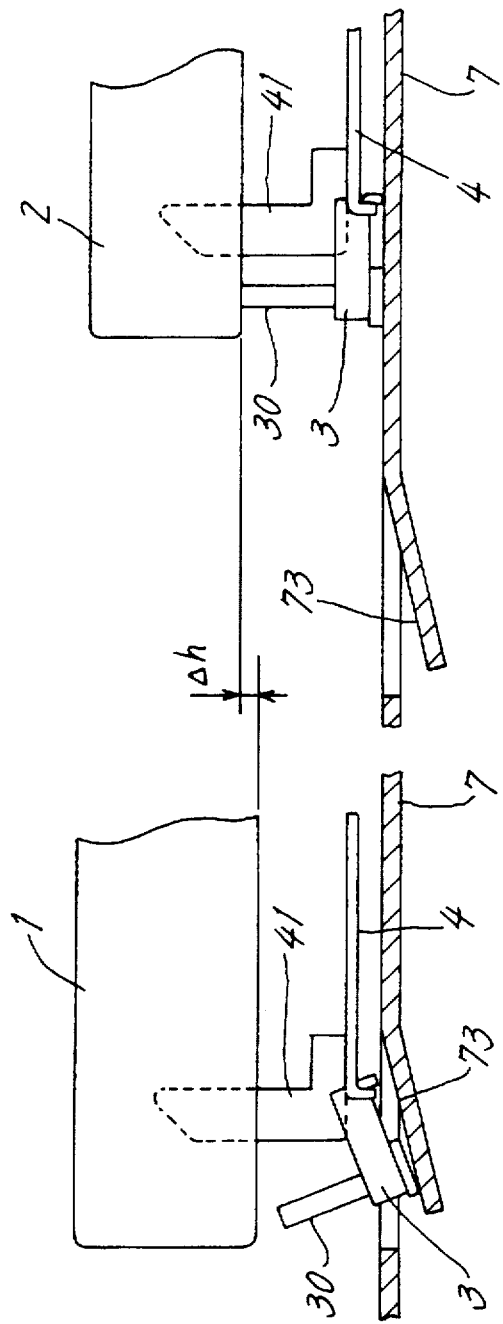
FIG. 3A is a view showing a holding piece as positioned when the large cassette is loaded and as seen from the direction Z in FIG. 1.
FIG. 3B shows the same when a small cassette is loaded.

With reference to FIG. 3A, a holding piece 3 carrying the prop pin 30 for supporting the small cassette 2 is engaged with a left side portion of the drive slide 4. The holding piece 3 is pivotally movable within a vertical plane orthogonal to the chassis 7. The chassis 7 has a slope 73 inclined rearwardly downward at the portion thereof to be opposed to the bottom surface of the piece 3. When the drive slide 4 is positioned rearward, the holding piece 3 rests on the slope 73, and the top end of the prop pin 30 is positioned below the bottom of the large cassette 1 and is clear of the cassette 1 as shown in FIG. 3A.

With reference to FIG. 1, disposed to the left of the left motor gear 52 is a drive gear 8 drivingly rotatable by another motor (not shown). An intermediate lever 80 having one end supported by one of the prop pins 71 is disposed in the rear of the drive gear 8. The drive gear 8 and the intermediate lever 80 are interconnected by a link 81 and rotatable in the same direction. A pivotally movable lever 82 is supported at its midportion by a pivot 88 on the lower surface of the other end of the intermediate lever 80. The lever 82 has one free end fitting to one of the engaging pins 42 of the drive slide 4.

A first pin 83 is provided upright on the other free end of the movable lever 82 and extends through an opening 84 formed in the intermediate lever 80. In the vicinity of the opening 84, a second pin 85 projects upward from the lever 80. At the left of the second pin 85, a torsion spring 86 with legs 87, 87 extending toward the pins 83, 85 is provided on the intermediate lever 80. The legs 87, 87 of the torsion spring 86 hold the first and second pins 83, 85 therebetween, biasing these pins toward each other.

In the position where the reels of the large cassette 1 are fitted to the reel supports 5, 5 as shown in FIG. 1, the drive gear 8 causes the link 81 to move the intermediate lever 80 clockwise. The movable lever 82 rotates with the intermediate lever 80 by being biased by the torsion spring 86.

The free end of each pivotal lever 50 is held between the stopper pin 74 and the inclined cam face 40a of the drive slide 4, whereby the drive slide 4 is positioned in place.

When the drive gear 8 moves the intermediate lever 80 further clockwise about the prop pin 71 from its normal position, the movable lever 82 beneath the lever 80 also acts to move clockwise about the prop pin 71, and the first pin 83 on the free end of the lever 82 pushes the torsion spring 86 in an opening direction against the force of the spring. The reaction of the spring 86 biases the movable lever 82 clockwise, so that the drive slide 4 in engagement with the movable lever 82 causes each inclined cam face 40a to hold the pivotal lever 50 in pressing contact with the stopper pin 74, whereby each reel support 5 is positioned in place.

The lower surface of rear end of the drive slide 4 is opposed to a link lever 9 formed with a cam groove 90. The lever 9 has one end supported by a pivot 92 on the chassis 7. A projection 43 on the lower surface of the drive slide 4 is fitted in the cam groove 90 to move the link lever 9 about the pivot 92 on the chassis 7 with the sliding movement of the drive slide 4.

The link lever 9 has a free end carrying an engaging pin 91 extending therethrough and having a lower end in contact with the chassis 7. The chassis 7 has a guide groove 76 obliquely extending toward the right reel support 5. The engaging pin 91 is fitted to the slide unit 6 which is movable along the guide groove 76.

Figure 2:
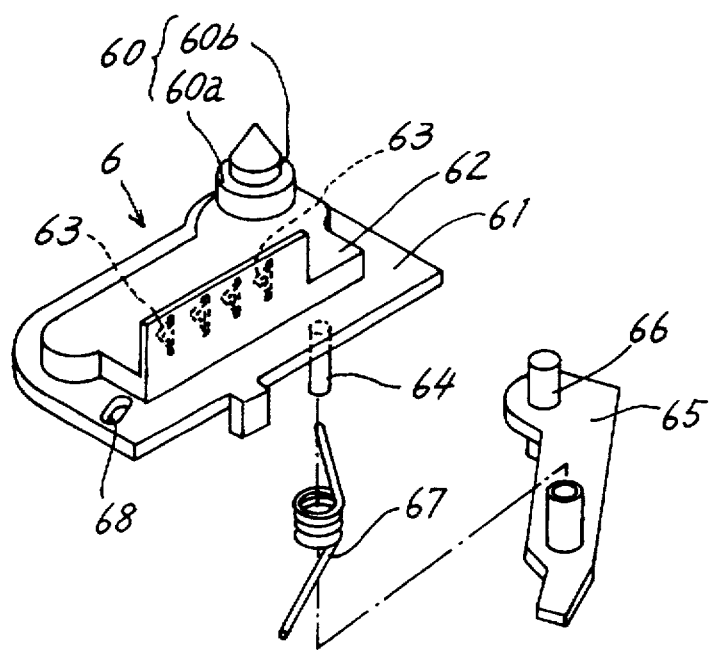
FIG. 2 is a perspective view of a slide unit.

With reference to FIG. 2, the slide unit 6 comprises a laterally elongaged holding plate 61 having a slot 68 with the engaging pin 91 fitted therein, a detection member 62 provided on the plate 61 and having contact pieces 63, 63, 63, 63 of spring material for contact with the respective cassette detection terminals 15, 15, 15, 15, the aforementioned stepped pin 60 for supporting the bottom of the large cassette 1 and for positioning the detection member 62 for the large and small cassettes 1, 2, and a holding lever 65 rotatably attached to a pivot 64 on the lower surface of the holding plate 61 and provided at one end thereof with the prop pin 66 for supporting the rear end of the small cassette 2. The prop pin 66 vertically extends through the lever 65 and has a lower end bearing on the upper surface of the chassis 7, whereby the top end of the prop pin 66 is maintained at a constant level (see FIG. 7). The pivot 64 has a lower end fitting in the guide groove 76 of the chassis 7. A torsion spring 67 provided around the pivot 64 biases the holding lever 65 clockwise.

Figure 5A:
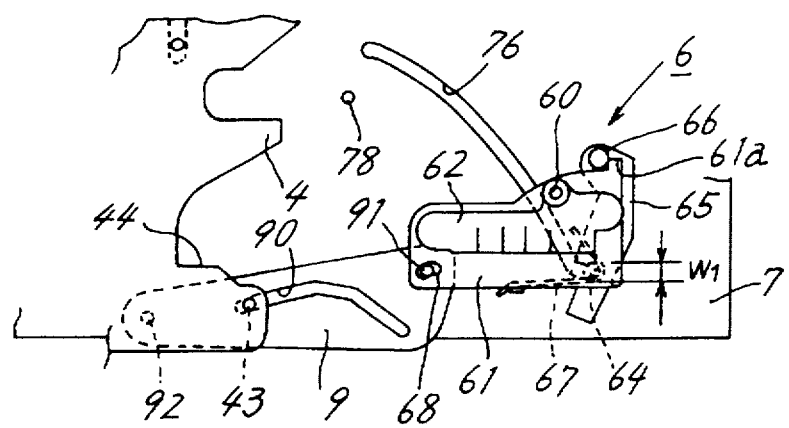
FIGS. 5A to 5C are plan views showing positions of the slide unit as moved.

As shown in FIGS. 5A and 1, the holding lever 65 is in pressing contact with a stopper 61a projecting from the front end of the holding plate 61. The prop pin 66 is positioned outside the large cassette loading position. In the vicinity of the front end of the guide groove 76, a stopper 78 projects upward from the chassis 7 for contact with a free end of the holding lever 65.

Figure 5B:
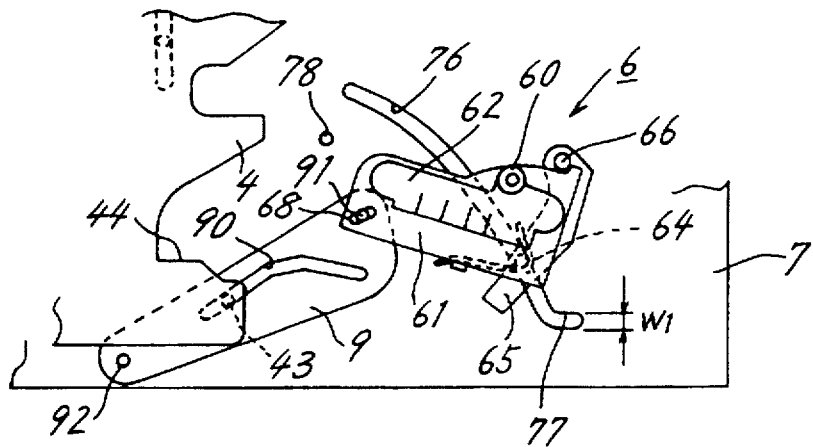

With reference to FIG. 5B, the guide groove 76 terminates in a horizontal groove 77 extending laterally rightward. The slide unit 6 has its pivot 64 fitted in the horizontal groove 77, with the holding plate 61 extending laterally. The horizontal groove 77 has a width W1 greater than the diameter of the pivot 64, with the result that the plate 61 is allowed to backlash by an amount corresponding to a clearance in the groove 77 around the pivot 64, whereby the stepped pin 60 is permitted to reliably fit into the positioning hole 13 of the large cassette 1.

Accordingly, the shanks 70b of the stepped pins 70, 70 on the chassis 7 fit into the front positioning holes 10, 11 of the large cassette 1, and the shank 60b of the stepped pin 60 of the slide unit 6 fits into the positioning hole 13 at the rear end right portion of the cassette 1 to position the detection member 62 in place relative to the large cassette 1 and also position the cassette 1 within a horizontal plane. The bottom of the cassette 1 is supported by the prop boss 60a of the stepped pin 60 and the prop pins 71, 71, 71 fixed to the chassis 7.

Sliding Movement of the Drive Slide

Figure 6A:
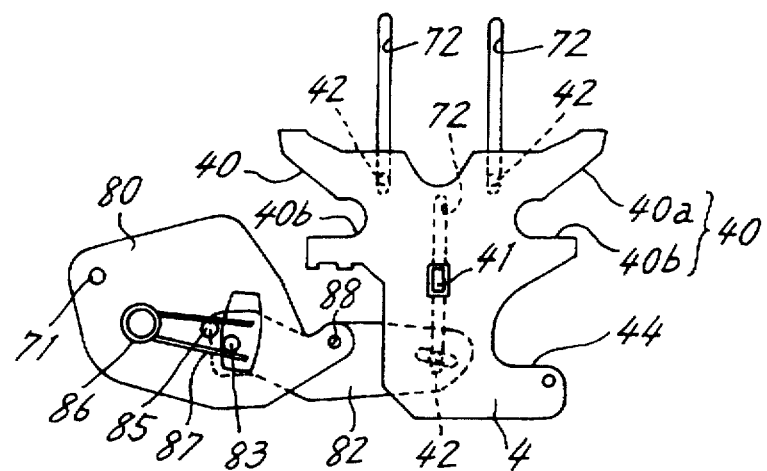
FIGS. 6A to 6C are plan views showing positions of an intermediate lever as moved.
Figure 6B:
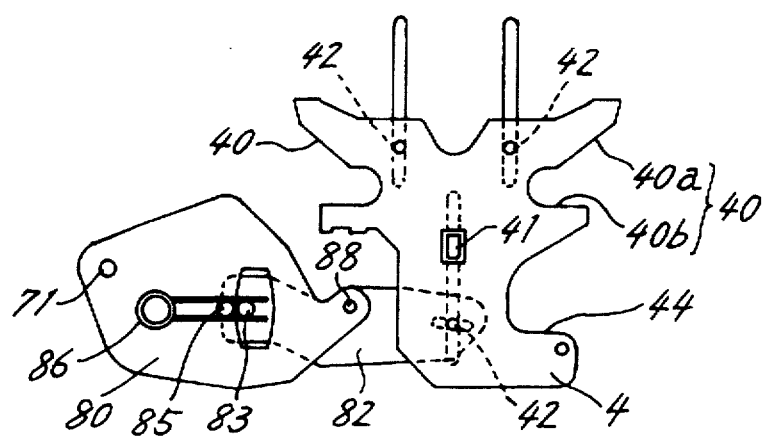
Figure 6C:
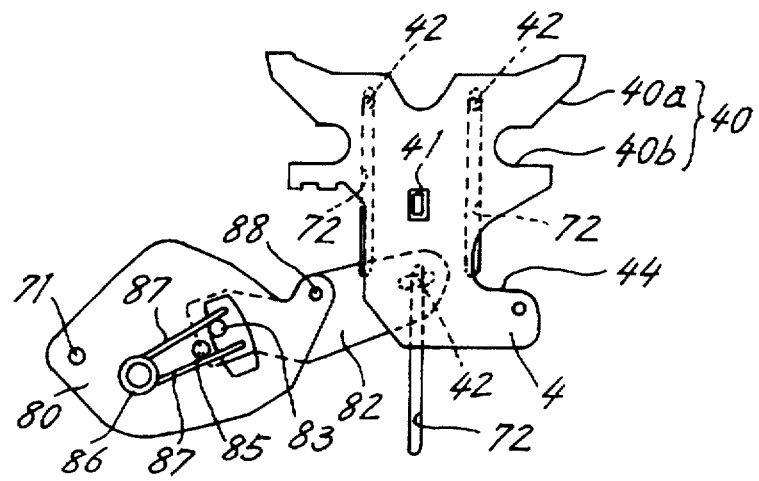

When the large cassette 1 is to be replaced by the small cassette 2, the drive gear 8 is rotated counterclockwise to move the reel supports 5, 5 to the small cassette loading position shown in FIG. 4. The gear 8 causes the link 81 to move the intermediate lever 80 from the position shown in FIG. 6A counterclockwise about the prop pin 71, also moving the movable lever 82 counterclockwise with the lever 80. As shown in FIG. 6B, the movable lever 82 and the intermediate lever 80 held by the torsion spring 86 both pivotally move, slidingly moving the slide 4 forward.

The cam faces 40a, 40a of the drive slide 4 move out of contact with the respective pivotal levers 50, 50, permitting the tension spring 53, 53 to rotate the levers 50, 50 inward. The free end of each lever 50 comes into contact with the stopper 75 on the chassis 7. The subsequent movement of the drive slide 4 causes the lever free end to be held between the stopper 75 and the circular-arc cam face 40b, whereby each reel support 5 is brought to the loading position for the small cassette 2.

The drive slide 4 comes to a halt with the free end of the pivotal lever 50 held between the cam face 40b of the slide 4 and the stopper pin 75 as seen in FIG. 4.

When the intermediate lever 80 in this state further rotates counterclockwise about the prop pin 71, the pivotally movable lever 82 beneath the intermediate lever 82 acts to rotate counterclockwise about the prop pin 71, causing the first pin 83 to open the legs 87 of the torsion spring 86. Each cam face 40b of the slide 4 coupled to the movable lever 82 is reliably pressed by the reaction of the spring 86 against the pivotal lever 50 which is in pressing contact with the stopper pin 75. This reliably brings the slide 4 to the small cassette loading position. Thus, the drive slide 4 is reliably positioned in place by the torsion spring 86 in the same manner as when the slide is positioned for loading the large cassette 1.

The drive slide 4 in the completely advanced position has been moved forward from the position corresponding to the large cassette 1 by the distance ΔY (see FIG. 9). The unlocking member 41 is in position to fit into the unlocking aperture 24 of the small cassette 2 as seen in FIG. 4.

The holding piece 3 slidingly moves forward on the chassis 7 along with the drive slide 4 from the position, shown in FIG. 3A, wherein the piece rests on the slope 73, and reaches a position where the prop pin 30 on the holding piece 3 supports the rear end of the small cassette 2 as shown in FIG. 3B.

Since the projection 43 of the slide 4 is engaged in the cam groove 90 of the link lever 9, the lever 9 in the position shown in FIG. 5A rotates counterclockwise about the pivot 92 on the shassis 7. The slide unit 6 in engagement with the link lever 9 moves out of the horizontal groove 77 and slides along the guide groove 76 forward as shown in FIG. 5B.

Figure 5C:
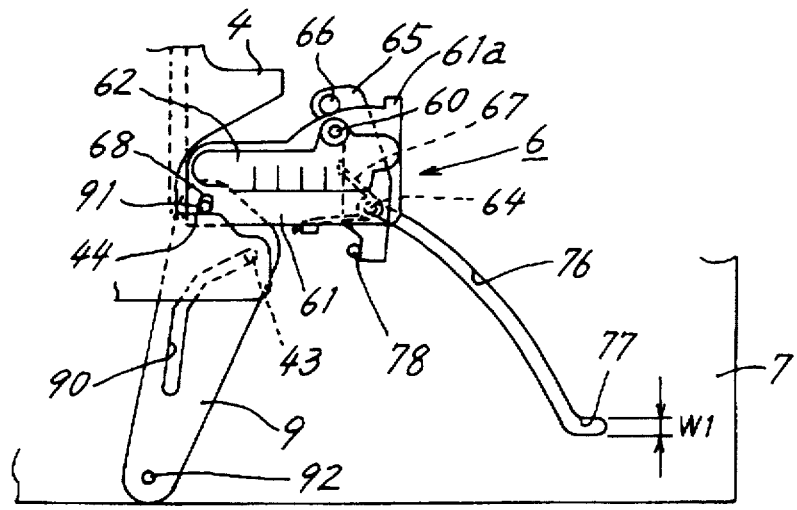

With reference to FIG. 5C, the slide unit 6 comes to a halt with the lengthwise direction of the holding plate 61 oriented laterally upon reaching the front end of the guide groove 76. The slot 68 now extends longitudinally of the chassis 7, preventing the holding plate 61 from shifting laterally. Upon the completion of rotation of the link lever 9, the engaging pin 91 contacts an edge 44 of the drive slide 4, whereby the slide unit 6 is prevented from backlashing in the direction of rotation about the pivot 64.

Figure 7:
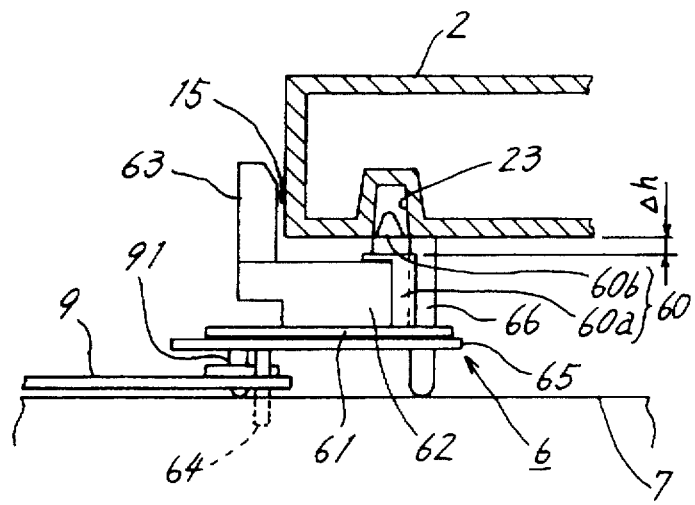
FIG. 7 is a side elevation of the slide unit in a small cassette loading position.

As shown in FIG. 7, the detection terminals 15 on the small cassette 2 are adapted to contact the respective contact pieces 63 of the slide unit 6. Since the contact pieces 63 are made of spring material as described previously, a pressing reaction from the terminals 15 presses the pivot 64 of the unit 6 against the chassis side wall defining the guide groove 76, also pressing the engaging pin 91 against the edge 44 of the drive slide 4 (see FIG. 5C). While the small cassette 2 is in its loaded position, the slide unit 6 is therefore prevented from inadvertently backlashing.

In the small cassette loading position, the free end of the holding lever 65 comes into contact with the stopper 78 on the chassis 7 as shown in FIG. 5C. The holding lever 65 rotates counterclockwise against the torsion spring 67, and the prop pin 66 initially located outside the large cassette loading position reaches a position for supporting the small cassette 2 (see FIG. 4). The prop pin 66 is so moved because the pin 66 for supporting the small cassette 2 becomes an obstacle if located inside the large cassette loading position since the small cassette 2 is loaded with its bottom at a higher level as already described.

With reference to FIG. 7, the fitting shank 60b of the stepped pin 60 on the slide unit 6 fits into the rear positioning hole 23 of the small cassette 2. Since the prop boss 60a serves to support the bottom of the large cassette 1, the bottom surface of the small cassette 2 is Δh above the top face of the boss 60a.

When the prop pin 60 shifts from the small cassette supporting position to the large cassette supporting position, the slide unit moves in a reverse manner to the foregoing movement, so that the reverse movement will not be described in detail.

Figure 8:
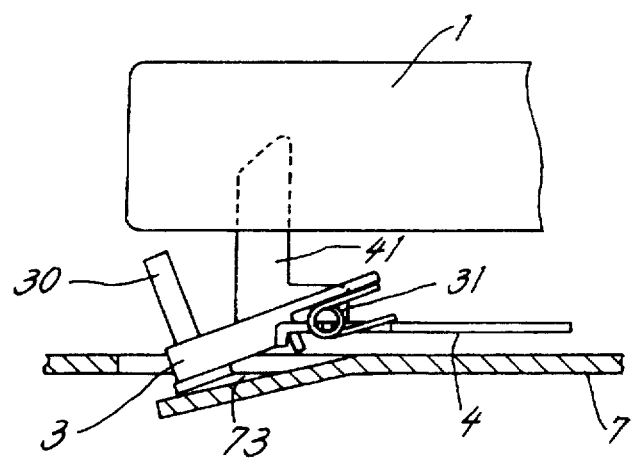
FIG. 8 is a side elevation of the holding piece jointed to a drive slide and provided with a torsion spring at the joint.

If the holding piece 3 of the above embodiment is biased downward with a torsion spring 31 provided at the portion the piece 3 jointed to the drive slide 4 as seen in FIG. 8, the holding piece 3 smoothly slides down the slope 73 when moving toward the large cassette loading position. The chassis 7 may be formed with a recessed portion (not shown) in place of the slope 73 for making the prop pin 30 clear of the large cassette.

What is claimed is:

1. A magnetic recording-reproduction apparatus, comprising a reel support moving mechanism for moving reel supports in corresponding relation with two kinds of large and small cassettes different in spacing between reels and formed with respective unlocking apertures for fitting therein a common unlocking member for unlocking the reels, wherein the reel support moving mechanism comprises a pair of pivotal levers pivotably supported on a chassis and each supporting the reel support rotatably on a free end thereof, a slide member provided on the chassis reciprocatingly movably for controlling the rotation of the pivotal levers and moving the reel supports to two different positions corresponding respectively to the large and small cassettes and a drive gear for driving the slide member, and pressure contacting means, disposed between the drive gear and the slide member, for positioning and holding the slide member in two cassette loading positions by pressing contact, with the rotation of the drive gear, wherein in the two cassette loading positions, the slide member is capable of contacting the free ends of the pivotal levers, the free ends of the pivotal levers being pressed against respective stopper pins on the chassis, and the pressure contacting means comprises an intermediate lever operably coupled with the drive gear, a movable lever pivoted at a central portion thereof to a free end of the intermediate lever and engaged with the slide member, and a spring member provided on the intermediate lever and engaged with the movable lever for biasing the movable lever in the direction of pressing the slide member into contact with the pivotal levers.

2. A magnetic recording-reproduction apparatus as defined in claim 1 wherein the two kinds of cassettes each incorporate a memory having specified information stored therein and have detection terminals connected to the memory and exposed from the cassette, and the chassis is slidably provided thereon with a slide unit connected to the slide member and having contact pieces positionable in contact with the respective detection terminals.

3. A magnetic recording-reproduction apparatus as defined in claim 2, wherein the slide unit has a stepped pin fittable in the large cassette for positioning the large cassette within a horizontal plane and supporting a bottom of the large cassette, the chassis being formed with a guide groove having fitted therein a pivot projecting out from a lower surface of the slide unit, and the guide groove includes a terminal portion corresponding to the large cassette loading position and having a width W1 greater than the diameter of the pivot to permit the slide unit to backlash within a horizontal plane with the stepped pin is fitted into the large cassette.

* * * * *